(No Model.)
F. S. BARTRAM.
FOUNTAIN PEN AND FOUNTAIN PEN HOLDER.
No. 338,019. Patented Mar. 16, 1886.
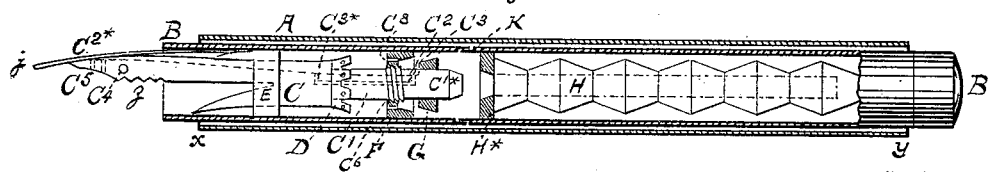
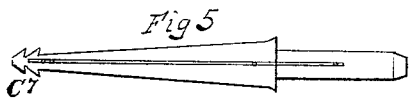
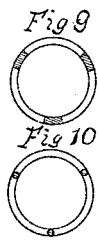
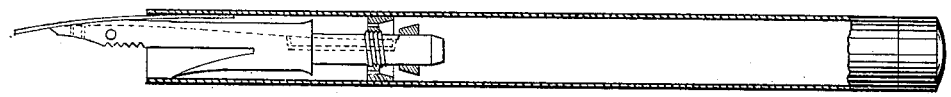
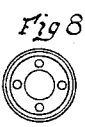
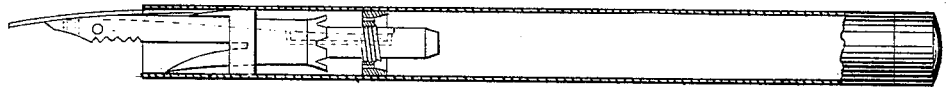
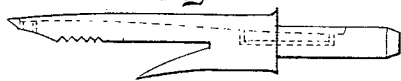
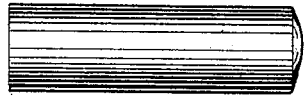
WITNESSES:
Chas. B. Bartram
J. Wreath
INVENTOR
F. S. Bartram
BY
F. S. Bartram
ATTORNEY
N. PETERS. Photo-Lithographer. Washington, D. C.

UNITED STATES PATENT OFFICE.

FERDINAND S. BARTRAM, OF NEW YORK, N. Y.

FOUNTAIN-PEN AND FOUNTAIN PEN-HOLDER.

SPECIFICATION forming part of Letters Patent No. 338,019, dated March 16, 1886.

Application filed August 18, 1885. Serial No. 174,709. (No model.)

*To all whom it may concern:*

Be it known that I, FERDINAND S. BARTRAM, a citizen of the United States, and a resident of 149 William street, New York, in the county of New York and State of New York, have invented certain new and useful Improvements in Fountain-Pens and Fountain Pen-Holders, of which the following is a specification.

My invention pertains to that class of fountain-pens having a tubular or hollow case closed at its upper end, or which is closed by an air-tight-fitting cap or plug, and may be filled or charged with ink at the lower or open end, or at a joint in said case near its open end, always providing for the admission of air only at the lower or open end of said tubular case.

The heterogeneous constituents and varied character of the numerous inks and writing-fluids of commerce are largely instrumental in producing the failure of so many of the fountain-pens heretofore invented, it having been repeatedly demonstrated that a pen which may write ordinarily well with one kind of ink proves a complete failure when charged with some other kind or mixture, owing to the difference in their composition, specific gravities, and consequent flowing properties.

After some years devoted to experiments and experience in their construction, I believe I have been successful in securing and maintaining absolute control over both air and ink under whatever conditions in a fountain-pen to be constructed, mainly, as is herein described.

Figure 1 of the accompanying drawings shows the pen complete. Figs. 2 and 3 are modifications of the same, also showing in what manner the feeder and its accompaniments may be adapted to case of other manufacture at the least expense, the feeder being inserted at the open end of any hollow tube, and held by the friction of the bulk-head F against the inner walls or bore of the case. Fig. 4 is a cap or cover, which may be placed upon either end, as required, and for which no claim is made. Fig. 5 is a top longitudinal view of the feeder whereon the pen rests near the point, showing the course of the open channel for conveying ink to the pen from the reservoir. Fig. 6 shows the bottom lines of the long and short channels of said feeder at a lateral view. Figs. 7 and 8 show the front and back transverse ends of the bulk-head F in Fig. 1. Figs. 9 and 10 are transverse ends of the outer case, A, where it rests upon bars or sections of cork, wood, or other substance inserted between the two cases, as hereinafter described at $x\,y$ in Fig. 1. Fig. 11 is a lateral view of the safety-collar. Fig. 12 is a lateral view of the spur-ring marked E in Fig. 1, and shown more distinctly in Fig. 12.

For a more detailed description of the different parts, suppose A to be the outer case, which is a hollow thin tube of hard rubber, celluloid, or other suitable material, preferably of a non-heat-conducting substance, open at both ends, and shorter than the inner case, B, extending only between the two shoulders formed on B, to secure a rest for the cap, Fig. 4. To the inner surface of A or outer surface of B are attached some strips or sections of cork, wood, or other non-heat-conducting substance, which are designed to keep the two cases from contact, except at the rest of cork, wood, or similar substance, and so permit the free circulation of air between them. Thus the ink in the inner case is protected from the varying temperatures communicated from the hand when the pen is in use, and prevents the expansion of air (when the reservoir is nearly empty) which drives the residue of ink downward in other fountain-cases to blot the paper.

B, the inner or main case, is tubular in form, constructed of hard rubber, celluloid, or other analogous material, and closed at the upper end by a tightly-fitting plug or cap, B', which may be removed when the rubber self-filler H is to be used, as will be hereinafter described.

C, the feeder, is constructed of any suitable material, preferably of hard rubber or celluloid, and partially pointed to conform to the nibs of the pen, but with the upper surface where the pen rests left intact or parallel with the main body of the same. Its circumference near and immediately back of the point where the pen rests is smaller than the base of the case, so that the pen may be inserted quite easily between them, where it is held at the point by the aid of a spring (shown in Fig. 1) upon the under side of said feeder, and for which no claim is here made, it having been allowed in a patent issued to Hoyt and Bartram, dated August 25, A. D. 1885.

C' is that portion of the feeder called the "stem," extending backward through the safety-collar D, bulk-head F, and regulator G, beyond which it terminates, having its extremity beveled or turned at C'* to conform to a seat in the ring H*, through which ink passes from the reservoir H, and which serves as an incidental "shut-off" to the downward passage of ink should an obstruction lodge within the regulator shut-off formed by the regulator G within the bulk-head F, as will be hereinafter described. This incidental shut-off is serviceable also when very short pens are used, requiring the feeder to be pushed backward almost to the verge of the inner case, B. This stem C' is made integral with the main body of the feeder, or may be attached thereto in any substantial manner. It is of circular cross-section, preferably, to permit it to have both a sliding or longitudinal and a rotary motion within the case, the former that it may be adjusted more rapidly to either position with reference to the kind of pen to be used and the ink-supply, the latter that when nearly closed at G F the regulator G may be drawn home to its seat within F by a slight adjustment of the feeder and closed with greater security. It may be pivoted with the thumb and finger at $C^4$, or by the thumb-nail within one or more depressions in the surface of the feeder made transversely, but which do not project above the surface of that part of the feeder. They may be seen at Z in Fig. 1. A short section of a screw-thread, $C^6$, is formed upon that portion of the stem seen within the bulk-head in Fig. 1, to enable it to be revolved within the inner surface of the front perforation of the bulk-head seen in Fig. 7, which is provided with a screw-thread to correspond.

$C^2$ is an ink-trough for conducting ink from the reservoir H to the pen $j$, and vice versa. It is closed at both ends or extremities, and is of trough-like conformation, into which, when the feeder lies horizontally, ink may be placed without running out. This channel commences in the solid point of the feeder near $C^{2*}$, and continues along its surface nearest the pen, through the safety-collar D, and along the surface of the stem C', through the bulk-head F, to the front base of the regulator G, where it stops.

$C^3$ is an auxiliary or additional channel for conveying ink from the reservoir to the main channel of the feeder, and vice versa. It is of tubular form, commencing near the point in the feeder-channel marked $C^{3*}$, extending downward to a line nearly parallel with the center of the stem C', thence backward on same line (underneath the open channel) through said stem C' to a point below the termination of the open channel $C^2$, where it again connects at an upward angle with said channel or trough $C^2$ or the surface of the stem. This tube performs various functions in connection with the open channel, and also independently of it. Should an ink-clot or other obstruction lodge within the trough $C^2$ underneath the bulk-head F or safety-collar D, the pen will continue to be supplied by this tube alone. When an unusual quantity of ink is needed for coarse pens, or India ink is used for drawing purpose, it is an essential factor. It is also largely instrumental in furnishing an additional inlet and air-passage for the rapid return of ink to the reservoir when the pen is inverted, and in draining backward any surplus ink that may accummulate about the sides of the feeder when the pen has been in long continued use.

$C^5$ $C^5$ are small transverse perforations or air-vents upon the under surface of the feeder into the open channel above, and are of value in releasing ink from the channel when the pen is in action.

$C^7$ $C^7$ are ink-grips protruding from the lateral surfaces of the feeder C, as shown in Fig. 5, serving to retain any surplus ink that may flow down outside the channel, where it will be held by them until the pen-nibs are raised by action, when it will pass underneath the pen and to the point as needed.

D is that portion of the feeder back of the pen whose circumference dilates backward from the main body of the feeder into a crown or bell shaped configuration nearly filling the bore of the case. This enlargement may be made integral with the main body of the feeder or in a separate section, as shown in Fig. 11. Its largest circumference or backward edge is serrated or perforated transversely, or both, sufficiently only to admit air and retain any surplus ink which might escape from the bulk-head or overflow in the stem-channel $C^2$; hence I call it the "safety-collar," as marked D in Fig. 1. It is perforated longitudinally through its upper surface where the open channel of the feeder C passes through it. The lateral perforation $C^4$ near the point of the feeder is for the purpose of facilitating the removal of the feeder from the reservoir, and I may use a small wire key, which may be inserted in this perforation for the purpose of adjusting and removing the feeder.

E, Fig. 1, (shown more distinctly in Fig. 12,) is a lateral view of the spur-ring. It is made of any suitable substance (preferably of hard rubber) in form of an ordinary ring cut from tubing, leaving it wide enough upon one side to form upon it a projecting spur forward, and inclined downward slightly, so that the pen may rest upon it and against the inner surface of the case when inserted in position, as seen in Fig. 1. This ring is held by friction within the case, allowing the feeder C to move freely in any direction through it without disturbing the pen. The spur may also be made of a separate piece of any suitable material, and attached to the front surface of the ring as a matter of economy in material.

F is termed the "bulk-head," is of cylindrical form, and may be made integral with the case or of separate substance inserted within it and held there snugly by friction. It has one main longitudinal perforation near the center of its front face, (seen in Fig. 7,) which extends a portion of the way therethrough, where it is met by a perforation from the opposite or back side of larger diameter. (See Fig. 8.) This perforation is enlarged or beveled backward to form an air-tight-fitting seat, into which the regulator G may be drawn to shut off the ink-supply, or graduate it, by methods hereinafter described. Around the front principal perforation, Fig. 7, are one or more small longitudinal perforations or air-passages independent of the main one, through which the feeder-stem C' passes or moves. These perforations extend but a part of the distance through the bulk-head F, where they are lost, or open into the backward larger diameter heretofore described, and shown in Fig. 8. These perforations are designed for the admission of air within the bulk-head, and thence upward to the reservoir to replace the vacuum caused by the downward flow of ink when the pen is in action.

G, the regulator, is a demi-coniform piece of hard or soft rubber, or any suitable material, of a circumference and conformation corresponding to the inner backward surface of the bulk-head F, which is firmly fixed upon the stem C' by a screw-thread or rivet, and whose function, as before stated, is to open, graduate, or close, according to its proximity to and within the bulk-head F at Fig. 8, both the ink and air supply by the longitudinal or rotary motion, or both, of the feeder C when operated at $C^4$ with the thumb and finger. This regulator, with its enlarged base, also resists to a considerable extent the full pressure or gravity of the bulk of ink within the reservoir, dispensing it downward more gradually and equally, and affording greater facility for the influx of air upward.

H is a self-filling device, of soft rubber or other analogous material, which obviates the necessity of the ordinary and separate filler or dropper used for filling the reservoir. It is of tubular zigzag conformation, closed at the upper end, and suspended at the lower end within a ring or stay held by friction against the inner surface of the case, as seen at H*, Fig. 1. Its operation is as follows: By removing the upper portion of the case at B' with an ordinary lead-pencil or rod it is to be forced downward until the folds are compressed, which exhausts the air from it. Then, with the open end at section K within a vessel of ink, if the pencil be withdrawn, the filler returns to its normal shape and ink enters the vacuum within it. The tube may also be filled in the ordinary manner at section K or at the open end by withdrawing the feeder C, or the tube may be removed and the case still serves the purpose of an ordinary ink-reservoir. The perforation within the ring H* is fitted to receive the extremity of the feeder stem, as has been heretofore described.

J is an ordinary pen in position.

The operation may be thus briefly described:

When ink has been injected into the reservoir by either of the methods provided, the feeder may be moved upward or downward by the thumb-nail at z, Fig. 1, until the quantity of ink required for the pen to be used is obtained, according to its flowing propensity, when the ink passes by gravity between the regulator and its seat in the bulk-head, where it is met by the air passing upward through the perforations at $C^8$, also seen in Fig. 7, and also by air passing downward with the ink into the channel $C^2$ and tube $C^3$ to the pen. Ink cannot become sluggish in the reservoir, but is kept in a constant state of ebullition when the pen is in action by the series of miniature air-bubbles passing through it to the condensing-chamber from the perforations $C^8$, hereinbefore described. When it is desired to shut off the ink-supply, a slight turn of the feeder at $C^4$ accomplishes it.

Fig. 2 shows a less expensive construction or modification of Fig. 1, whereby the safety-collar D, vertical self-filler H, ring H*, and spur-ring E may be omitted, its operation remaining the same, and with many varieties of inks it works as well as Fig. 1.

Fig. 3 shows other modifications whereby the safety-collar D may be used with the spur-ring E without the regulator G or stops or screw-thread $C^6$. The safety-collar D may also be omitted in either of the figures shown herein, and the pen will still do good service. The pen may also be made and used without the bulk-head F, filler H, ring H*, safety-collar D, and with the spur-ring E, feeder C, Fig. 6, but is not adapted to so general a variety of inks.

I am enabled by the use of the spur-ring E to construct a modification of the pen by using only two other parts, viz: the feeder C, shown in Fig. 6, and the case B, Fig. 1, thus making a pen of fewer parts, of cheaper construction, and at the same time increasing the ink-holding capacity of the reservoir by bringing the spur-ring E into direct contact with it, as follows: The spur-ring E', with its main perforation slightly reduced to the diameter of Fig. 7 and adjusted a little lower down in the case and with its spur slightly elongated, becomes a substitute for the bulk-head F, heretofore described, and when the pen j is placed above the spur attached to the ring E within the case, and the stem of the feeder C is inserted underneath the spur and within the perforation of the ring E, with its shoulder against the parallel front wall or surface of the said ring, it forms a perfect working pen for general uses without the cut-off. The under surface of this said spur also forms, from its junction with the said ring, a sufficient covering and protection over the open channel of the feeder C to prevent effectually any overflow of ink when writing or when the pen is held vertically for any length of time, which is an important advantage over those of any other construction. This feature, furthermore, enables the use of shorter and smaller pens than can be utilized in others, as the channel is always closed or covered between the heel of the pen (however long or short) and the reservoir, so that ink cannot escape except through the channel to the nibs of the pen when in action. The shoulder upon the feeder C, Fig. 6, at its junction with the stem, when forced backward closely against the parallel wall of the ring E, diminishes or closes the space around the stem to the influx of air to the reservoir and holds the ink in partial suspension until and as released by its inverse movement toward the point of the pen, so that by means of this spur-ring and movable feeder the supply or flow of ink can be controlled by the writer with exactness. The feeder, being also removable, affords immediate access to the reservoir for quickly refilling, and for other purposes.

It is evident that other slight changes may be made in the form and arrangements of the several herein-described parts without departing from the spirit and scope of my invention; hence I do not wish to limit myself to the precise construction herein set forth.

I am aware of the existence of English Patent No. 4,401, of September 14, 1883. In said patent a collapsible rubber bulb is used for filling the reservoir with ink. This bulb or bag is placed in the reservoir, and is attached to a push-button at its upper end, by which it is depressed or twisted to expel the air, and in resuming its normal position the ink is drawn into it. I make no claim to such a construction. My device is different in its construction and operation.

I am also aware of Patent No. 236,158, dated January 4, 1881. In this stylographic pen an outer case surrounds the reservoir and is attached thereto at its lower end by a screw-threaded joint, its upper end being perforated for the admission of air into the ink-chamber. The defect of this construction is that the air between the case and reservoir having become heated by the warmth of the hand is not readily displaced by cold air from without, and then only sufficiently to occupy the space or displacement of the ink as used, while in my construction there is no connection between the air and reservoir or ink within it, and a free circulation of air is constantly maintained through both the upper and lower ends of the outer case, which are always open. I make no claim to the construction shown in said patent.

Having fully described my invention, what I claim as new, and desire to secure by Letters Patent, is—

1. A fountain-pen having an outer case surrounding the reservoir-case, said outer case being connected to the reservoir-case at its upper and lower ends by pieces of cork or similar material placed between said reservoir-case and said outer case to admit a free circulation of air between them, for the purpose described.

2. An ink-trough for a fountain-pen, consisting of an open longitudinal channel in a bar having a stem, said channel being closed at both extremities and formed in the surface of the bar next to the under surface of the pen for the purpose of conveying ink from the reservoir to the pen and from the pen to the reservoir, substantially as herein described.

3. In a fountain-pen, a feed-bar having its upper end reduced in diameter from a point about midway of the length of said bar to form a stem, the latter being provided with an ink-conduit near its center which connects with a channel or groove formed exteriorly on the upper surface of said feed-bar and stem, substantially as described.

4. A feed-bar for a fountain-pen, having its upper surface of the proper contour to conform to the convexity of an ordinary pen and of sufficient diameter to be inserted easily within the case, between which surfaces the pen may rest, and having its circumference back of the pen enlarged into a crown or bell shaped configuration toward the inner circumference of the case, and having said bell-shaped edge serrated or perforated transversely, as required, for the necessary admission of air to the reservoir, and as and for the other purposes herein described.

5. A bulk-head in a fountain-pen case between the reservoir and the pen and through which a portion of the feed-bar passes, said bulk-head having a central perforation to accommodate the stem of the feed-bar and having a number of auxiliary perforations for the admission of air to the reservoir, and being designed for the dispensing of ink to the feed-bar and pen and for the independent admission of air to the reservoir, said bulk-head being adjusted or constructed within the case, substantially as hereinbefore described, and for the purposes specified.

6. In a fountain-pen, a regulator and stop consisting of a movable feed-bar having a channel and a convexed stop or plug affixed to said bar, in combination with a wall or bulk-head adjusted or constructed within the case between the reservoir and pen, having a recess through which said bar passes, and a backward convexing seat within and back of said recess into which said plug or stop is drawn, said feed-bar being operated by its exposed part at the open end of the case by sliding or rotating, or both, within the case for the purposes of increasing, decreasing, or stopping entirely the supply of ink to the pen, said bar having upon a portion of its surface a section of a screw-thread conforming to and moving within a similar one cut within said recess for the purpose of better securing said bar and regulator firmly within its seat, all substantially as hereinbefore described, and for the purposes set forth.

7. In a fountain-pen, a stop to shut off the supply of ink from the reservoir, consisting of a movable bar within the case having a channel in said bar, in combination with a ring fixed within the case near the lower end of the reservoir, said bar having its extreme backward or inward end beveled to fit a corresponding seat within said ring, and operated at its exposed end by revolving or sliding said bar backward to and within its seat in said ring, substantially as hereinbefore described, and for the purposes specified.

8. In a feed-bar for a fountain-pen, one or more transverse perforations or air-vents upon its under surface near its point extending upward into the ink-channel, and a larger lateral perforation, $C^4$, near the point, and one or more notches in its under surface cut transversely, by the aid of which said feed-bar may be operated in either direction for the purposes hereinbefore specified.

9. A feed-bar for a fountain-pen, having one or more lateral projections near its point which form retaining-grips for the ink and prevent the surplus ink from overflowing or dropping from the point of the pen, substantially as described.

10. In a fountain-pen, a spur-ring, E, consisting of a ring adjusted within the case in proximity to the reservoir, said ring having a front or outer parallel wall or surface from which projects a spur designed to keep the pen from contact with the feeder except at or near its point and operates as a cover lying over and upon the open channel of a feeder to prevent the escape of ink therefrom, and constructed substantially as hereinbefore described.

11. In a fountain-pen, a movable and removable feeder consisting of the feeder C, having a stem, $C'$, an open channel, $C^2$, in combination with a spur-ring, E, adjusted within the case B, through which said feeder may have a reciprocating movement for the purpose of increasing, diminishing, or suspending the flow of ink from the reservoir to the pen, said feeder also being removable from the case independently of the pen for the purpose of more rapidly replenishing the reservoir, all constructed substantially as herein described.

12. In a fountain-pen, a self-filling device consisting of a flexible tube hollow and closed at its upper end, and movable longitudinally and vertically within the case, and having a friction-ring or similar means at its lower end for holding it properly within the case, said filler being adapted to be operated to expel air from and draw ink upward within itself, as hereinbefore described, and for the purposes set forth.

13. In a fountain-pen, the spur-ring constructed as described, in combination with a feed-bar having a stem at its upper end and channeled as described, said spur-ring and feed-bar each being capable of independent adjustment within or of removal from the case, substantially as described.

14. The fountain-pen herein described, having the duplex case, the collapsible filler, the perforated bulk-head, the channeled feeder having a stem at its upper end carrying a regulator or valve adjustable to the valve-seat in the bulk-head, and the safety-collar, all substantially as described.

F. S. BARTRAM.

Witnesses:
CHAS. B. BARTRAM,
J. WREATH.